(12) United States Patent
Cannon

(10) Patent No.: US 6,516,738 B2
(45) Date of Patent: Feb. 11, 2003

(54) METHOD AND APPARATUS FOR DELIVERING OZONE TO BALLAST TANKS

(75) Inventor: Todd Cannon, Norman, OK (US)

(73) Assignee: Nutech O3, Mclean, VA (US)

( * ) Notice: Subject to any disclaimer, the term of this patent is extended or adjusted under 35 U.S.C. 154(b) by 48 days.

(21) Appl. No.: 09/803,307

(22) Filed: Mar. 9, 2001

(65) Prior Publication Data

US 2002/0066399 A1 Jun. 6, 2002

Related U.S. Application Data

(60) Provisional application No. 60/250,872, filed on Dec. 1, 2000.

(51) Int. Cl.[7] ............................................... B63B 25/08
(52) U.S. Cl. ...................................... 114/125; 114/74 R
(58) Field of Search ............................... 114/125, 74 R; 422/186.07, 186.11, 186.12, 186.15; 210/760

(56) References Cited

U.S. PATENT DOCUMENTS

| 4,176,061 A | | 11/1979 | Stopka |
|---|---|---|---|
| 5,008,087 A | | 4/1991 | Batchelor |
| 5,169,606 A | | 12/1992 | Batchelor |
| 5,545,380 A | | 8/1996 | Gray |
| 5,552,125 A | | 9/1996 | Chamblee |
| 5,569,437 A | | 10/1996 | Stiehl et al. |
| 5,578,280 A | | 11/1996 | Kazi et al. |
| 5,587,131 A | | 12/1996 | Malkin et al. |
| 5,630,990 A | | 5/1997 | Conrad et al. |
| 5,667,756 A | | 9/1997 | Ho |
| 6,019,949 A | * | 2/2000 | Dunder .................. 422/186.07 |
| 6,125,778 A | | 10/2000 | Rodden |
| 6,139,809 A | | 10/2000 | Rodden |
| 6,143,256 A | * | 11/2000 | Shinagawa et al. .... 422/186.15 |

* cited by examiner

*Primary Examiner*—Ed Swinehart
(74) *Attorney, Agent, or Firm*—Philip D. Freedman PC; Philip D. Freedman

(57) ABSTRACT

A ballast-water treatment system is provided. An ozone generator is operated by a supply of voltage, which is regulated by a voltage controller. Ozone is provided to a ballast tank through an ozone-transport system. The system may include a pressure generation system to regulate a flow pressure such that the flow pressure is substantially ambient at an exit end of the ozone generator and has a positive pressure when reaching the ballast tank.

19 Claims, 7 Drawing Sheets

METHOD AND APPARATUS FOR DELIVERING OZONE TO BALLAST TANKS

CROSS-REFERENCE TO RELATED APPLICATION

This application claims the benefit of U.S. Provisional Application Serial No. 60/250,872, filed Dec. 1, 2000, the disclosure of which is incorporated herein by reference in its entirety for all purposes.

BACKGROUND OF THE INVENTION

The present invention relates generally to a system for using ozone to treat ballast water during transit of a sea vessel from one port to another. More specifically, the invention is related to a method and apparatus for controlling an ozone generator voltage.

Sea vessels routinely use ballast tanks to maintain balance when traveling empty, the weight of the ballast water being used to compensate for the lack of cargo weight when the cargo load is empty or partial. For example, in a typical transport operation, a vessel may travel to a first port with a load of cargo and relatively little ballast water. When it reaches the first port, it takes on ballast water at the same time as the cargo is unloaded. The vessel then travels to a second port to receive cargo, where it discharges the ballast water.

One effect of this type of operation is that various organisms may be transported by the vessel between ports in the ballast water. The water typically contains algae and zooplankton, among other organisms, that may be indigenous to the cargo-discharge port but not to the cargo-loading port. There are examples where the movement of ballast water by vessels has caused harmful nonindigenous organisms to be transported to ports. One of the more striking examples is the introduction of the freshwater zebra mussel into the Great Lakes of North America in 1986.

Zebra mussels originated in the Balkans, Poland, and areas of the former Soviet Union, and were introduced through the transport of ballast water to Lake St. Clair, a small Canadian water body connecting Lake Huron and Lake Erie, in 1986. The natural predators of zebra mussels, some diving ducks, freshwater drum, carp, and sturgeon, are not sufficiently numerous in North America to have any significant impact on limiting their increase due to reproduction. As a consequence, there has been a large increase in zebra mussel population since its introduction, with the spread having been documented into Lake Erie, Lake Michigan, and numerous rivers. The behavior of the organism includes colonization of water intake pipes, and has been documented to reduce the intake of water-treatment plants, hydroelectric and nuclear power plants, and water-supply plants by as much as two thirds. In addition, zebra mussels threaten the existence of indigenous species, such as the winged mapleleaf clam, which is rendered unable to open its shell to eat when large numbers of zebra mussels colonize the shell.

The cost of attempting to control the freshwater zebra mussel had been estimated at $5,000,000,000 by 1995. Numerous informal efforts have been organized to try to identify and limit the further spread of the organism. At a formal level, the U.S. Congress passed the National Invasive Species Act (P.L. 104–332) in 1996 to arrest the spread of nonindigenous species by water-ballast discharge. Among other provisions, the Act requires the development of national guidelines to prevent the introduction of organisms into U.S. waters through movement of ballast water. One approach has been to have a vessel undertake ballast exchange on the high seas. In addition to the time and manpower needed to perform this operation without the benefit of simultaneously loading and/or unloading cargo, the emptying of ballast tanks on the high seas may create dangerous conditions, particularly in poor weather.

SUMMARY OF THE INVENTION

Embodiments of the invention are thus directed to a ballast-water treatment system. In one embodiment, an ozone generator is operated by a supply of voltage. A voltage controller regulates the supply of voltage provided to the ozone generator, and an ozone-transport system is provided to convey ozone from the ozone generator to a ballast tank. In certain embodiments, the system also includes a pressure generation system. The pressure generation system is configured to regulate a flow pressure such that the flow pressure is substantially ambient at an exit end of the ozone generator and has a positive pressure when reaching the ballast tank. In one such embodiment, the pressure generation system includes a plurality of pump sets connected in parallel. Each of the pump sets in turn includes a plurality of pumps connected in series.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DESCRIPTION OF THE SPECIFIC EMBODIMENTS

1. Introduction

Figure 1:
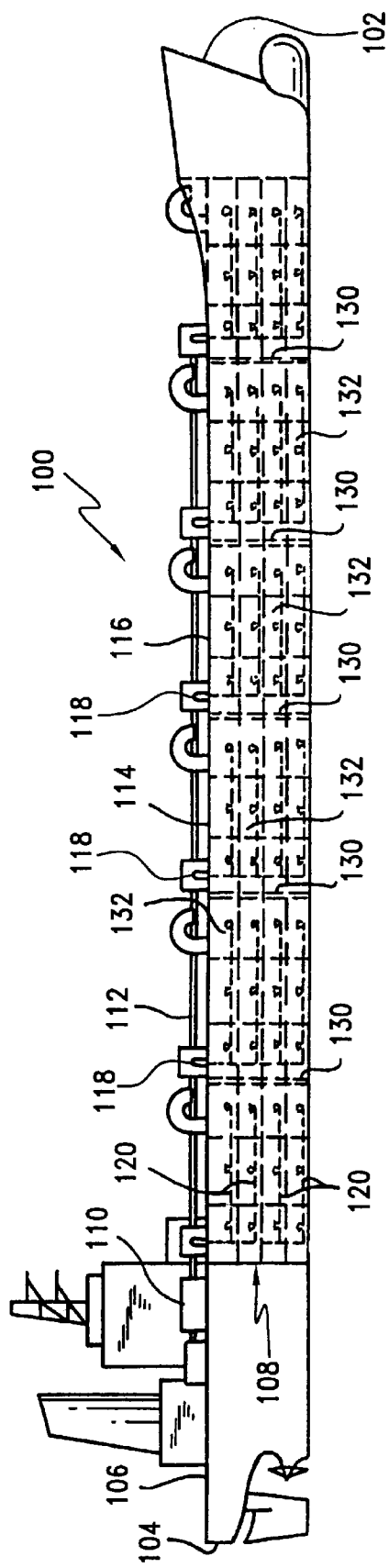
FIG. 1 is a schematic side view of a tanker including an ozone ballast-treatment system.

One approach that has been used to prevent the introduction of nonindigenous species has been to destroy the possible infestation in the ballast water with ozone ($O_3$). Ozone is currently used as a means for purifying liquids, but most applications for this technology have centered on relatively low liquid volume applications. Ozone has been increasingly suggested as a candidate for very large scale liquid purification projects, and may be suitable for purification of ballast water. The use of ozone in the treatment of ballast water is viewed as a cost-effective, environmentally sound method of eliminating organisms in the water that may be transported to other regions. Ozone is a very strong oxidizer and in seawater has been shown rapidly to convert naturally occurring iodides and bromides into bromine and iodine, which are toxic to the organisms. The general concept is to use the vessel's transit time between ports as an opportunity to treat the ballast water with ozone. Treatment with ozone is viewed as superior to both chemical treatment, which may require the transportation and disposal of hazardous substances over the sea, and separation technology, which is uneconomical because of the large volume of water requiring filtration.

There are a number of complexities that arise in attempting to adapt the process, which is reasonably well developed for low liquid volumes, to the very large volumes used as ballast water. Further complexities arise from the particular characteristics of ballast tanks as used on large traveling vessels.

2. System Overview

Ozone is a high-energy allotropic form of oxygen. Typically, ozone is produced by passing oxygen, in some concentration, through a highly charged corona field, technique known as "corona discharge". The corona may be produced by applying a very high electric potential ($\geq 20$ kV) between two conductors that are separated by an insulating dielectric layer and a small air gap. Under these conditions, molecular oxygen ($O_2$) passing through the gap between the conductors experiences sufficient dissociation energy to partially ionize. A certain fraction of the free oxygen ions will reassociate in the form of $O_3$, according to the equilibrium reaction equation:

$$3O_2 + 69 \text{ kcal} \Leftrightarrow 2O_3.$$

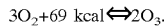

Because the above equation is an equilibrium reaction, it can proceed in either direction denoted with the double arrow. The reaction is endothermic to produce $O_3$, requiring energy, and is exothermic to produce $O_2$, giving up energy. Because of its equilibrium nature, the actual efficiency of this ozone formation is relatively low, in the range of 2–8%, depending on the oxygen content of the feed gas and the temperature of the reaction. Consequently, after being processed in this way, the oxygen feed gas acquires a dilute mixture of ozone. This dilute mixture is then diffused through the treatment liquid. However, the high-energy state of ozone results in very low stability of the gas. The natural tendency is for the ozone to revert back to the more stable, lower-energy allotrope $O_2$. While the solubility of ozone in water is approximately 13 times as great as the solubility of $O_2$, it has a very short half-life, about 40 minutes in distilled water at a pH of 7.6. Consequently, the storage of ozone is impractical and ozone generation must be performed substantially at the location of its use.

An example of a system used to deliver ozone to purify ballast is provided in U.S. Pat. No. 6,125,778, entitled "Ballast Water Treatment," and issued to Raymond M. Rodden, which is herein incorporated by reference for all purposes. An overview of the system is illustrated in FIG. 1, which corresponds generally to FIG. 3 of U.S. Pat. No. 6,125,778. The illustrated vessel is a tanker 100, including a bow 102 and a stem 104. In some embodiments, the tanker 100 includes a double hull. The tanker 100 is representative of the kinds of vessels on which embodiments of the invention may be used.

Between the bow 102 and the stem 104, the tanker 100 includes tank sections 108 on both the starboard and port sides, perhaps separated by a longitudinal bulkhead (not shown) that extends the length of the tanker 100. The tank sections 108 are also separated along their lengths by transverse bulkheads 130, which may extend into the spacing between the inner and outer hulls if the tanker 100 is of the double-hull type. The spacing between the two hulls are also divided by horizontal plating 120, so that with the transverse bulkheads 130, this spacing is divided into a plurality of ballast tanks 132. An ozone generator 110 is located on the tanker 100, shown in FIG. 1 as located on the bridge 106 of the aft section. A main ozone feed line 112 runs from the ozone generator 110 along the top deck 116, parallel to the longitudinal axis of the tanker 100, to deliver ozone to the ballast tanks 132. Off lines 118 are connected to the main feed line 112 with valves 117 (not shown in FIG. 1) and intersect the main feed line 112 perpendicularly, extending downwards into an array of ballast tanks 132.

Components of the ozone delivery system are preferably constructed of materials resistant to ozone, such as one or more of 316 or 316L stainless steel tubing, Chemfluor™ tubing, and 316L/viton connectors. Alternative materials that are resistant to ozone may alternatively be used, although metal such as copper and/or chromium should be avoided. Such metals are very reactive with ozone due to the highly oxidative nature of the ozone.

In operation, the ozone is produced by the ozone generator 110 so that it may be provided along the main feed line 112. If the valves 117 are actuated to connect one or more of the off lines 118 to the main feed line 112, ozone will be infused into the respective ballast tanks 132. Infusion is continued until the ballast water is substantially treated, which may be evaluated by monitoring the halide content of the water. As explained above, bromide and iodide in the ballast water are oxidized by the infusion of ozone to produce levels of bromine and iodine toxic to organisms in the ballast water. While the organisms remain viable, the bromine and iodine are consumed by them so that an increase in the concentration of these compounds is an indicator that the organisms have been destroyed.

3. Ozone Production

Figure 2A:
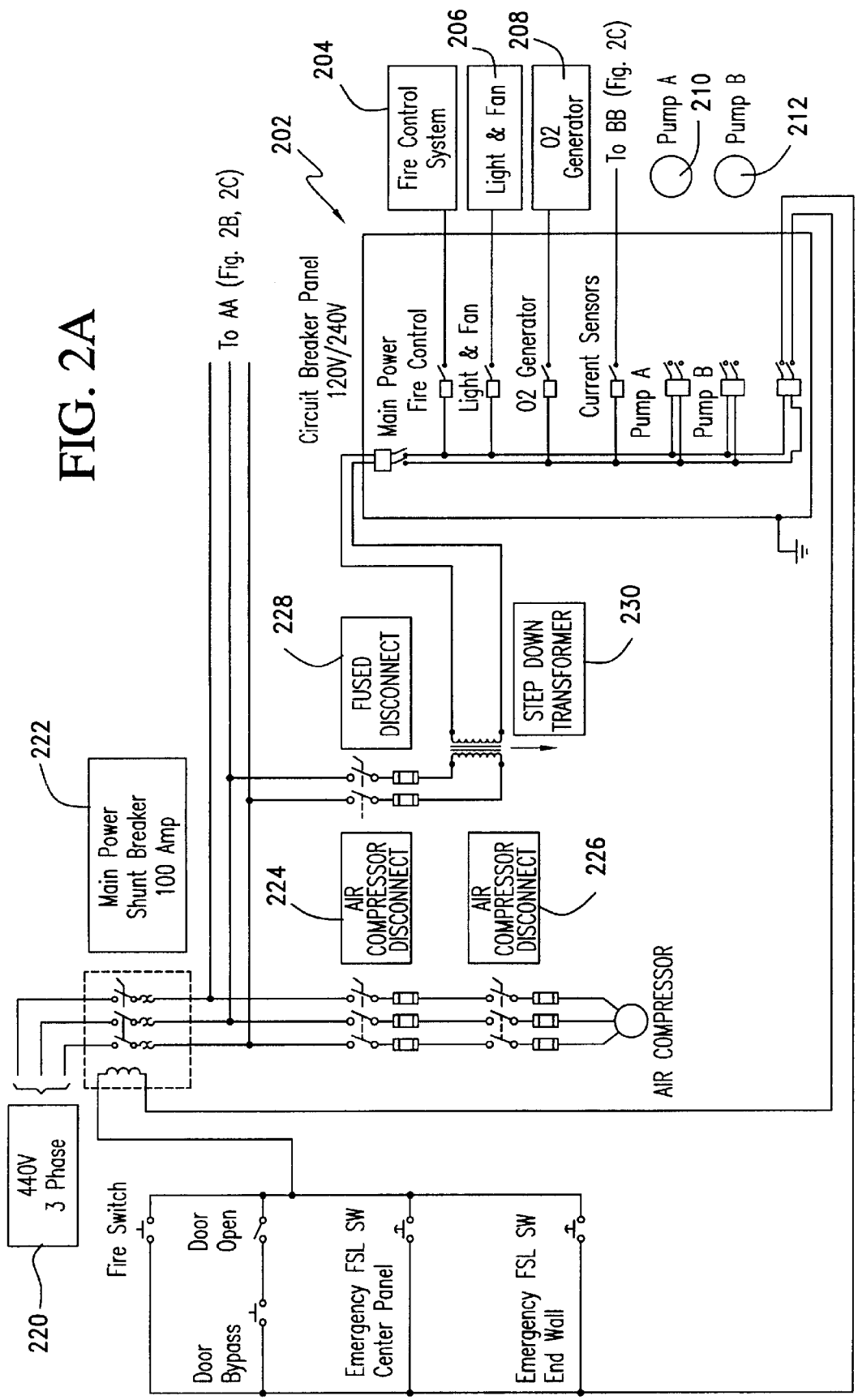
FIGS. 2A–2C show an electrical schematic. of an ozone generator according to one embodiment of the invention.
Figure 2B:
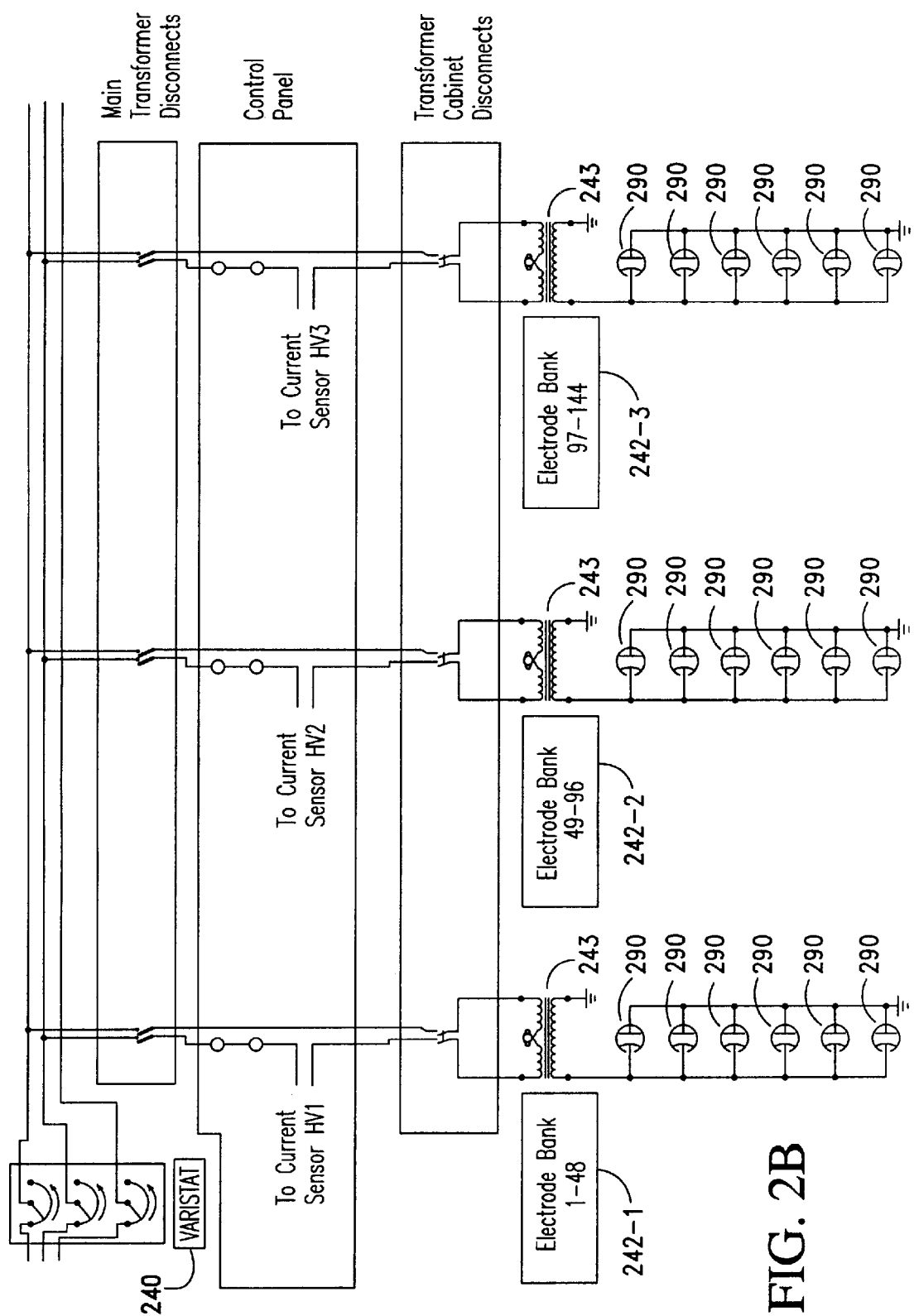
Figure 2C:
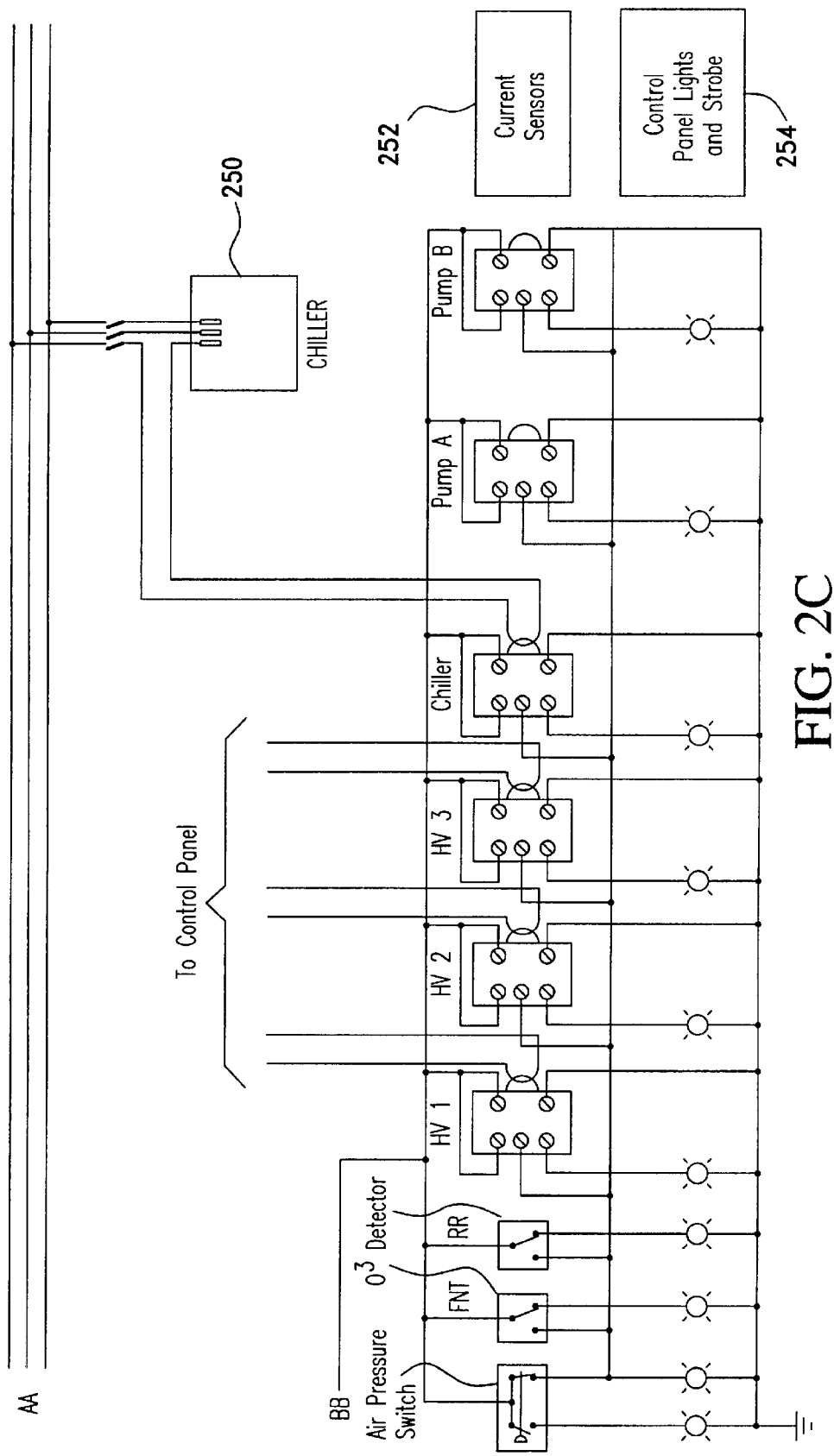

An electrical schematic of the ozone generator 110 according to one embodiment of the invention is shown in FIGS. 2A–2C. The ozone generator 110 includes a circuit panel 202 that may be connected, in addition to the individual ozone generation electrodes, to a variety of subsystems, including a fire control system 204, a light and fan system 206, an $O_2$ generator system 208, and pumps 210 and 212. Various current sensors 252 are configured to detect when such subsystems are active and to illuminate lights on a control panel display 254 to monitor the overall status of the system.

The ozone generator includes a voltage supply 220, which on a supertanker may be specified as a 3-phase 440-V supply. This voltage supply 220 provides power through a main-power shunt breaker 222, shown in the particular embodiment to be a 100-A breaker, to the principal components of the system. The voltage supply is connect to air compressors through air compressor disconnects 224 and 226, to the circuit panel 202 through a pulse disconnect 228 and step-down transformer 230. In addition, the voltage supply is connected to the individual ozone generation electrodes 290 through current sensors connected to the control panel display 254 and through a voltage controller 240. High voltage is produced by connecting to the individual electrodes through a transformer 243. The electrodes 290 may be organized into a plurality of banks, only some of which may be illustrated, each shown in the figure to include 48 individual electrodes, so that an entire bank is energized simultaneously with a corresponding indicator light on the control panel display 254. Using a series of electrodes 290 is beneficial to provide sufficient quantities of ozone for the treatment of the large volumes of ballast water.

Figure 3:
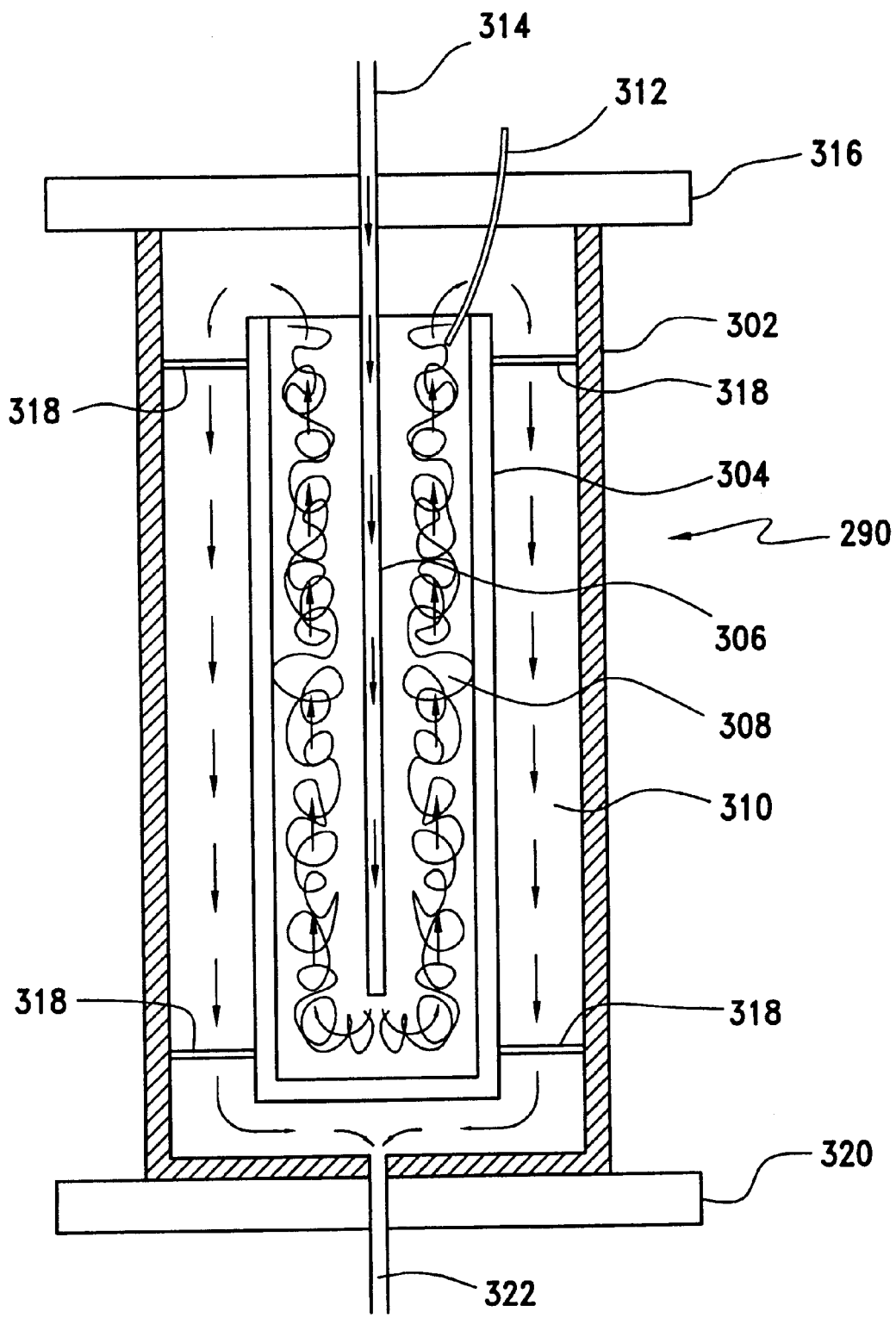
FIG. 3 illustrates the configuration of an electrode used in embodiments of the invention for the generation of ozone.

The basic structure of each of the electrodes 290 is shown for one embodiment in FIG. 3. Ozone generation is performed in this embodiment with a cylindrical electrode configuration. A housing 302 functions as a ground electrode and may be fabricated, for example, from 316 stainless steel. A glass tube 304 may be configured within the housing to act as a dielectric material. The inner electrode 308 may similarly be fabricated of 316 stainless steel wool or mesh, placed within the glass tube 304. An air gap 310 between the glass tube and the steel housing may be maintained through the use of insulating spacers 318, such as may be fabricated out of Teflon®. The inner electrode 308 is connected with the voltage supply 220 through lead 312. The electrode is sealed with end caps 316 and 320, but includes openings 314 and 322 to permit the flow of gases through the electrode.

When a voltage difference is applied to the inner and outer electrodes, and $O_2$ gas is flowed into the electrode 290 through opening 314, some of the energy from the voltage difference is extracted to produce ozone. The flow of gas within the electrode 290 is shown schematically by the short arrows. Oxygen $O_2$ gas flows through the steel wool or mesh from opening 314 and into the air gap 310 where a corona discharge has resulted from the high voltage difference between the inner and outer electrodes. Some of the $O_2$ is converted to ozone according to the reaction equation described above, and the $O_2$/ozone mixture flows out of the electrode 190 through opening 322.

The efficiency of the electrode configuration is enhanced by the function of the voltage controller 240, which acts to mitigate a number of otherwise limiting effects that result from local power generation. While the voltage supply 220 may be nominally configured to provide three-phase 440-V voltage, the actual voltage may vary between 380 and 450 V. This voltage variability may cause any of several difficulties. High initial voltages may lead to an initial breakdown of the electrodes 290 because of the large in-rush currents. Such breakdowns are due to a failure of the glass dielectric material used in the electrodes 290. In addition, electrode breakdowns may be accompanied by combustion of the steel-wool inner electrode 308. This combustion danger may lead to an extremely hazardous situation on a vessel, more especially so if the vessel is carrying inflammable cargo such as oil.

The voltage controller 240 acts to prevent dielectric breakdown from large inrush currents. Instead of the danger of a high initial voltage, the voltage can be stepped up to the operating level slowly. This may be achieved either manually or as part of a continuous automated process. The voltage controller 240 can also be used to regulate voltage variably during actual ozone generation. In addition, it provides a safe, controlled method for ozone generator shutdown with minimized stress on the generator electrodes 290. The voltage controller 240 also acts to ensure that the voltage provided to the electrodes 290 is not varied by the operation of other devices that may also be connected with the voltage supply 220, such as those illustrated in FIG. 2. Without the voltage controller 240, every time such a device is activated or deactivated, there would be shift away from optimized operating conditions of the electrodes 290 or a possibility of dielectric breakdown.

Further benefits of using a voltage controller 240 include the ability to tailor the electrical configuration to the particular characteristics of the electrodes 290, especially when the electrodes are obtained commercially and may have wide variability. For example, if the electrode system is unable to handle a 440-V supply safely, the voltage controller 240 may be used to operate the system at a safe lower voltage, say 375 V. More generally, the voltage controller 240 can be used to maximize ozone output for the given electrode configuration and operating conditions by maintaining an optimized voltage.

4. Pressure Generation System

The structural arrangement of many vessels in which ozone purification may be used also requires that the ozone be delivered to the ballast tanks 132. The depth of water in such tanks, and therefore also the pressure that must be overcome for delivery of the ozone, may be significant. A typical supertanker, for example, has tanks with a water depth of as much as 70 feet, resulting in 35 PSI of pressure to be overcome. Such back pressure opposing the flow of ozone-containing gas results in a net positive pressure on the ozone generator.

The inventors have discovered that the presence of a back pressure, even a relatively small back pressure as may result from a relatively shallow ballast tank 132, may have a very negative effect on the production efficiency of the ozone generator 110. Even a back pressure of as much as 2 PSI has a significant effect and lowers the generator's efficiency. As noted in the description above, the formation of ozone requires overcoming a certain energy barrier, i.e. 69 kcals for every three molecules of $O_2$ converted into two molecules of ozone. An increase in the back pressure of the gas stream moving through the electrode 290 acts to increase the energy required for oxygen dissociation. Thus, at fixed power levels, the ozone conversion is reduced significantly. While it is possible to attempt to compensate for the resulting efficiency decrease by increasing the input power to the ozone generator electrodes, this may also increase the possibility of dielectric breakdown. Electrode systems may already be designed to operate at peak power levels in the absence of back pressure conditions.

The inventors have also discovered that a net negative pressure (i.e. a vacuum) may also cause significant difficulty with the operation of the ozone generator 110. As the strength of the vacuum is increased, the current within the individual electrodes 290 also increases. As described before, this increase in current may result in dielectric breakdown of the glass tube 304, causing system failure and presenting the possible hazards of a fire on a vessel that transports inflammable cargo.

Figure 4:
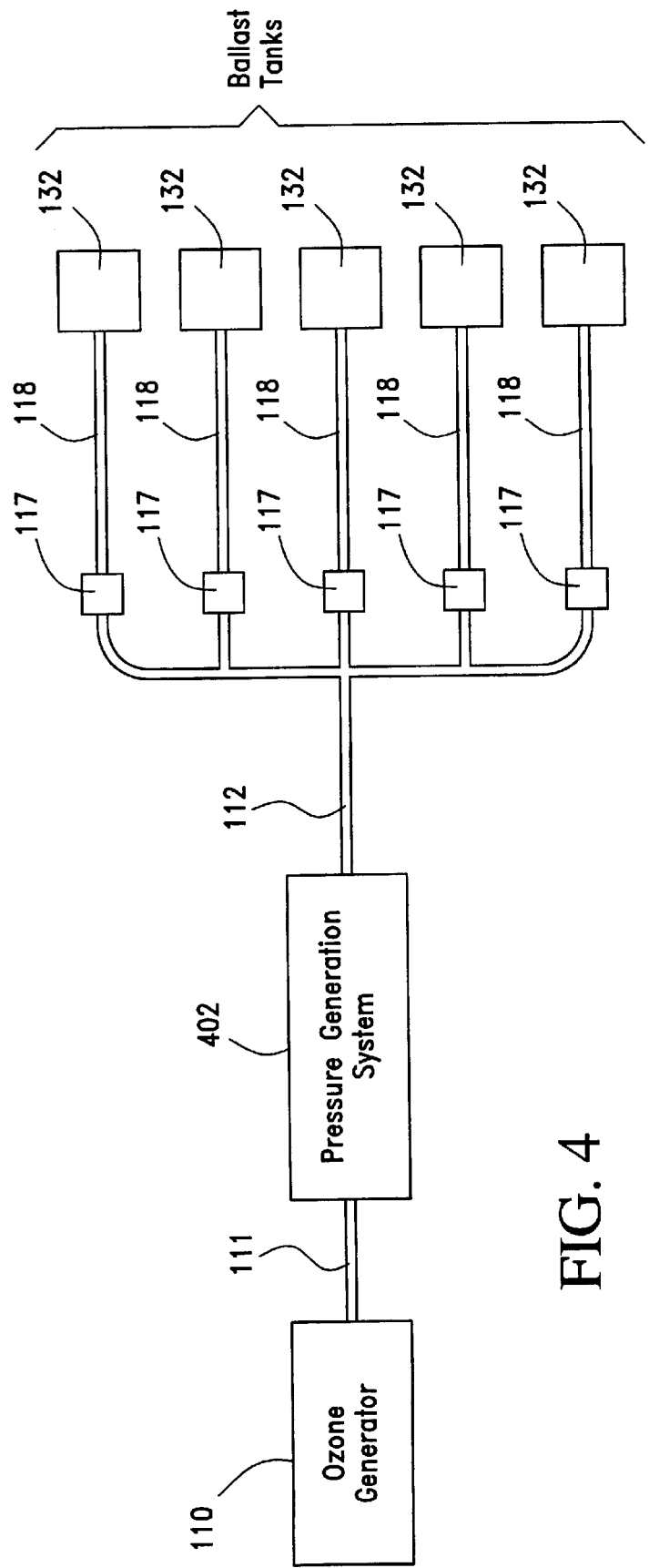
FIG. 4 is a schematic illustration of embodiments of the invention that use a pressure generation system.

In accordance with embodiments of the invention, a pressure generation system 402 is positioned after the ozone generator 110, as illustrated schematically in FIG. 4. Such an arrangement simultaneously addresses both of the concerns outlined, for positive and negative pressures. The pressure generation system 402 is connected with the ozone generator 110 through feed line 111 and performs the following functions: (1) maintains a substantially ambient ("zero") pressure at the outlet of the ozone generator 110, i.e. at the inlet of the pressure generation system 402, and (2) maintains a predetermined positive pressure at the outlet of the pressure generation system 402. The $O_2$/ozone gas mixture flows to the ballast tanks 132 through main feed line 112, valves 117, and off lines 118. The predetermined positive pressure is sufficient for efficient gas delivery in the application. Use of such an arrangement also prevents the possibility of a negative pressure being applied to the electrodes 290 in the ozone generator 110.

Figure 5:
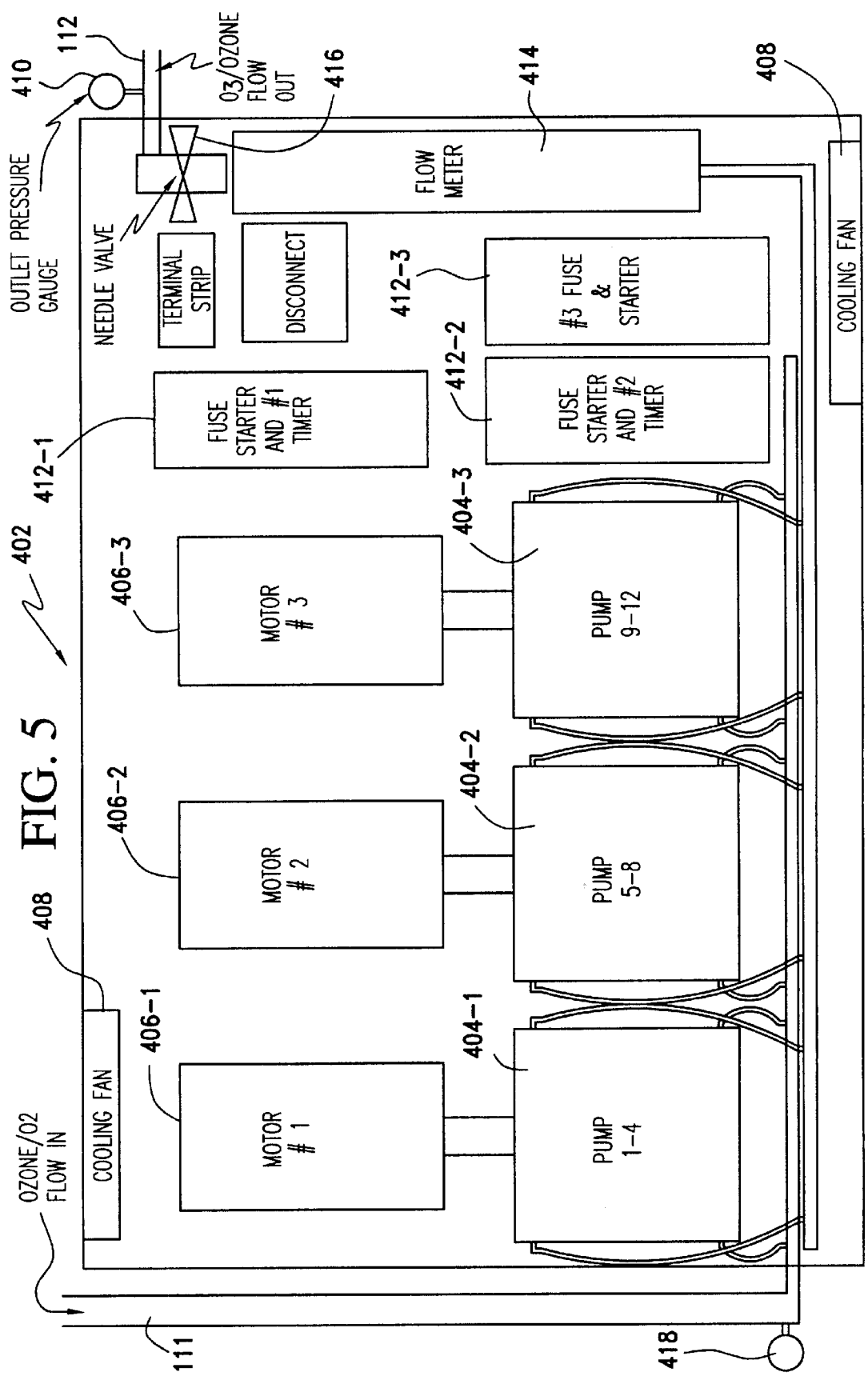
FIG. 5 is a schematic illustration of one embodiment of a pressure generation system used with the invention.

In the case of a supertanker with 70-foot deep ballast tanks and a corresponding back pressure ("head pressure") of 35 PSI, an outlet pressure in the range of 50–70 PSI has been found to be desirable. These pressures may be obtained with a system comprising an arrangement of diaphragm pumps, one embodiment of which is shown in FIG. 5. The pressure generation system 402 is configured to recompress the ozone-containing gas after its exit from the pressure generation system 402 in order to force it to the bottom of the ballast tanks against the 35 PSI head pressure. The specific arrangement used makes use of two facts: (1) pressure is additive in series and (2) flow rate is additive in parallel. Exploiting the series nature of pressure addition, a plurality of pumps is configured in series to obtain the desired pressure. A plurality of such pump sets are then placed in parallel with one another to obtain the desired flow rate. The number of diaphragm pumps in series or parallel, as well as the capacity of the individual pumps may be varied to adjust the delivery pressure and flow rate of the pressure generation system 402. In one embodiment, the pressure generation system is calibrated by initiating the ozone generator 110 prior to the application of voltage to the electrodes 290. This permits the pressure at the outlet of the ozone generator 110 to be tuned to ambient pressure for the given ozone generator inlet flow rate prior to the generation of any ozone.

The embodiment of the pressure generation system 402 shown schematically in FIG. 5 uses twelve diaphragm pumps to achieve the desired pressure and flow rate. In the illustrated arrangement, each pump set 404 includes four diaphragm pumps. The pump sets 404 are arranged in parallel with one another, are powered by motors 406, and controlled by fuse, starter, and timer sets 412. A flow of $O_2$/ozone is input into the pressure generation system 402 through feed line 111 where the pressure is measured by inlet gauge 418. The pressure of the flow is increased by the pump arrangement, passes through a flowmeter 414 and a needle valve 416 where its pressure is measured by outlet pressure gauge 410. The pressurized flow then proceeds to the ballast tanks 132 via the main feed line 112. The pressure generation system 402 is cooled during operation by one or more cooling fans 408.

An alternative embodiment uses liquid cooling within the pumps rather than relying on air cooling as is provided by the cooling fans 408. Ozone begins to break down in a temperature range of 105–110° F. In certain configurations, particularly those using a larger number of pumps to achieve high pressures and flow rates, the temperatures may reach in excess of 150° F. even with forced air cooling. For such configurations, liquid cooling to maintain temperatures below 105° F. is preferable.

This configuration of the pressure generation system 402 may develop pressures as great as 120 PSI from the output of a single ozone generator 110. The specific configuration shown in FIG. 5 delivers a flow of 160 L/min at 50 PSI with a net ambient pressure on the gas stream passing through the ozone generator 110. The pressure generation system 402 may be used in combination with the ozone generator described above or may be used in combination with other ozone generators, such as described in U.S. Pat. No. 6,139,809, entitled "Injected Flow Ozone Generator," and issued to Raymond H. Rodden, which is herein incorporated by reference for all purposes.

While a detailed description of presently preferred embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A ballast-water treatment system comprising:
   an ozone generator operated by a supply of voltage;
   a voltage controller to regulate the supply of voltage provided to the ozone generator; and
   an ozone-transport system for conveying ozone from the ozone generator to a ballast tank; and
   a pressure generation system comprising a plurality of pump sets connected in parallel, each such pump set including a plurality of pumps connected in series configured to regulate a flow pressure such that the flow pressure is substantially ambient at an exit end of the ozone generator and has a positive pressure when reaching the ballast tank.

2. The ballast-water treatment system as recited in claim 1 wherein the ozone generator comprises a plurality of ozone generation electrodes, each such ozone generation electrode being configured to use a corona discharge to convert a supply of $O_2$-containing gas into an ozone-containing gas.

3. The ballast-water treatment system as recited in claim 2 wherein the plurality of ozone generation electrodes are grouped as electrode banks, each such electrode bank including a plurality of ozone generation electrodes and wherein the voltage controller includes a plurality of transformers, each such transformer connected with one of such electrode banks.

4. The ballast-water treatment system as recited in claim 1 wherein the positive pressure exceeds 20 PSI.

5. The ballast-water treatment system as recited in claim 1 wherein the positive pressure exceeds 35 PSI.

6. The ballast-water treatment system as recited in claim 1 wherein the pressure generation system further includes a cooling subsystem.

7. The ballast-water treatment system as recited in claim 6 wherein the cooling subsystem is a liquid cooling subsystem.

8. A ballast-water treatment system comprising:
   an ozone generator operated by a supply of voltage;
   an ozone transport system for conveying ozone from the ozone generator to a ballast tank; and
   a pressure generation system configured to regulate a flow pressure such that the flow pressure is substantially ambient at an exit end of the ozone generator and has a positive pressure when reaching the ballast tank.

9. The ballast-water treatment system as recited in claim 8 wherein the positive pressure exceeds 20 PSI.

10. The ballast-water treatment system as recited in claim 8 wherein the positive pressure exceeds 35 PSI.

11. The ballast-water treatment system as recited in claim 8 wherein the pressure generation system comprises a plurality of pump sets connected in parallel, each such pump set including a plurality of pumps connected in series.

12. The ballast-water treatment system as recited in claim 11 wherein the pressure generation system further includes a cooling subsystem.

13. The ballast-water treatment system as recited in claim 12 wherein the cooling subsystem is a liquid cooling subsystem.

14. A method for purifying ballast water, the method comprising:
   providing a supply of voltage to an ozone generator to generate a flow of ozone-containing gas;
   regulating the supply of voltage provided to the ozone generator; and
   transporting the flow of ozone-containing gas from the ozone generator to a ballast tank; and regulating a flow pressure of the ozone-containing gas such that the flow pressure is substantially ambient at an exit end of the ozone generator and has a positive pressure when reaching the ballast tank.

15. The method recited in claim 14 wherein regulating a pressure of the flow of ozone comprises directing the flow of ozone through a plurality of pump sets connected in parallel, each such pump set including a plurality of pumps connected in series.

16. The method recited in claim 14 further comprising maintaining a temperature of the flow of ozone-containing gas below 105° F.

17. A method for purifying ballast water, the method comprising:

providing a supply of voltage to an ozone generator to generate a flow of ozone-containing gas;

transporting the flow of ozone-containing gas from the ozone generator to a ballast tank; and regulating a flow pressure of the ozone-containing gas such that the flow pressure is substantially ambient at an exit end of the ozone generator and has a positive pressure when reaching the ballast tank.

18. The method recited in claim 17 wherein regulating a pressure of the flow of ozone comprises directing the flow of ozone through a plurality of pump sets connected in parallel, each such pump set including a plurality of pumps connected in series.

19. The method recited in claims 17 further comprising maintaining a temperature of the flow of ozone-containing gas below 105° F.

* * * * *